United States Patent [19]

Yoshifuji

[11] 4,378,712
[45] Apr. 5, 1983

[54] CONTROL CABLE

[75] Inventor: Junnosuke Yoshifuji, Takarazuka, Japan

[73] Assignee: Nippon Cable System, Inc., Japan

[21] Appl. No.: 291,415

[22] Filed: Aug. 10, 1981

Related U.S. Application Data

[63] Continuation of Ser. No. 63,402, Aug. 3, 1979, abandoned.

[30] Foreign Application Priority Data

| Feb. 27, 1979 | [JP] | Japan | 54-22766 |
| Apr. 6, 1979 | [JP] | Japan | 54-42256 |
| Apr. 6, 1979 | [JP] | Japan | 54-42275 |

[51] Int. Cl.³ .............................................. F16C 1/10
[52] U.S. Cl. ..................................... 74/501 R; 74/422
[58] Field of Search ............ 74/501 R, 501 M, 501 P, 74/422, 424.6, 425

[56] References Cited

U.S. PATENT DOCUMENTS

| 2,195,400 | 4/1940 | Arens | 74/501 R |
| 2,211,790 | 8/1940 | Pile | 74/501 R |
| 2,382,966 | 8/1945 | Arens | 74/501 R |
| 2,821,092 | 1/1958 | Cordora et al. | 74/501 R |
| 3,176,538 | 4/1965 | Hurlow | 74/501 R |
| 3,994,185 | 11/1976 | Gilardi | 74/501 P |
| 4,038,881 | 8/1977 | Conrad | 74/501 P |
| 4,099,425 | 7/1978 | Moore | 74/501 P |

FOREIGN PATENT DOCUMENTS

| 61841 | 5/1975 | Australia | 74/501 R |
| 48-9283 | 3/1973 | Japan | |
| 52-17146 | 2/1977 | Japan | 74/501 R |

*Primary Examiner*—Kenneth Dorner
*Attorney, Agent, or Firm*—Armstrong, Nikaido, Marmelstein & Kubovcik

[57] ABSTRACT

A control cable having a foamed elastic layer provided between an inner cable and a conduit, in which by the existence of the foamed elastic layer, the control cable is especially free from a noise generated when operated.

3 Claims, 2 Drawing Figures

CONTROL CABLE

This is a continuation of application Ser. No. 63,402, filed Aug. 3, 1979, now abandoned.

BACKGROUND OF THE INVENTION

The present invention relates to an improved control cable.

The control cable comprises essentially a flexible conduit (in some cases, a non-flexible one) and a flexible inner cable inserted into the conduit, and is used for transmitting a power which is obtained by operating one end of the inner cable by means of pull, push-pull or rotation to the another end thereof. Therefore, the control cable is frequently adopted for the remote control in the various machines or equipments in industry.

Since the conduit is generally formed from a metal spiral tube so as to be capable of enduring the operation of the inner cable as mentioned above, and the inner cable is generally formed from metal strand wires, the conduit and the inner cable are scraped against each other in the above operation, whereby the control cable generates a noise, and further generates frictional resistance. To exclude such a problem, various methods are proposed prior to the present application.

The control cable which has the inner tube formed from a synthetic resin, e.g. nylon resin, between the conduit and the inner cable is, for example, proposed for excluding the above problem. However, such a control cable is not especially sufficient to prevent the noise, since the inner tube is merely formed by molding of the synthetic resin.

In a automobile, a large number of control cables are used for the various remote controls, for example, raising and lowering of a window glass, opening and shutting of a sliding roof, of a trunk lid, functioning of a speedometer, operating of a choke, of a accelerator, of a driving-mirror, or the like. However, the generated noise gives uncomfortableness to a driver and a passenger, even if the noise is slight. In addition, the noise generated from the control cable by the vibration of the automobile also gives uncomfortableness to them. Accordingly, it is required to prevent the noise as much as possible.

Then, in the other conventional control cable proposed, a brush-like hairiness is adhered to either an outer circumference of the inner cable or an inner circumference of the conduit. However, such a control cable has drawbacks wherein; the hairiness tends to take off easily and wears with use of a comparatively short duration, and further the operation of the inner cable is prevented by the accumulation thereto of the hairiness taken off, and as a result, the control cable cannot achieve the original purpose.

OBJECTS OF THE INVENTION

The main object of the present invention is to provide an improved control cable for excluding the abovementioned drawbacks in the conventional control cables.

Another object of the invention is to provide a control cable which can be produced more easily.

Other objects and advantages of the invention will become more apparent from the following description with reference to the accompanying drawings.

DETAILED EXPLANATION OF THE INVENTION

Figure 1:
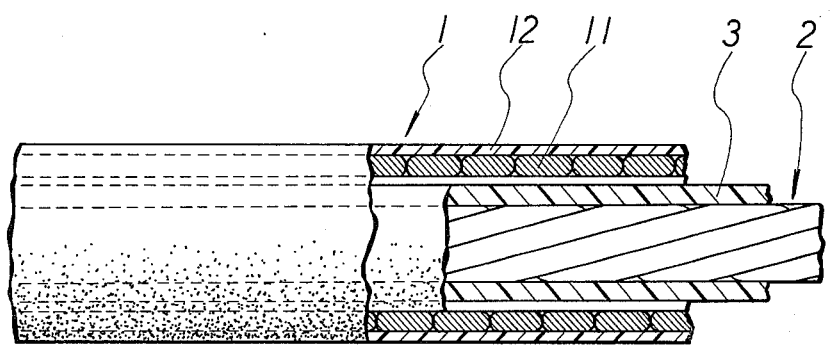
FIG. 1 is a front view partly broken away and showing an embodiment of the control cable of the present invention.

With reference to FIG. 1 for showing an embodiment of the control cable of the present invention, a conduit 1 comprises a metal spiral tube 11 and a flexible cover 12, e.g. polyvinyl chloride film, provided on the outer circumference of the metal spiral tube 11. An inner cable 2 is formed from metal strand wires (in some cases, a single metal wire), and is adhered closely with a foamed elastic layer 3 on the outer circumference thereof.

The above foamed layer 3 is preferably produced, for example, from at least one selected from the group consisting of a foamed urethane rubber, a synthetic resin sponge and a sponge rubber.

The foamed layer 3 comprising the foamed urethane rubber is formed, for example, by admixing the urethane prepolymer with water of which amount is equal to the amount of the urethane prepolymer, applying on the outer circumference of the inner cable 2, and then heating so as to be foamed on the inner cable 2 by means of chemical reaction of urethane prepolymer with water.

Also, the foamed layer 3 comprising the synthetic resin sponge is formed by admixing 100 parts by weight of a pasty resin, e.g. polyvinyl chloride, with 6 to 100 parts by weight of a plasticizer, 2 to 3 parts by weight of a stabilizer and 1 to 3 parts by weight of a foaming agent, applying on the outer circumference of the inner cable 2 in a similar manner as mentioned above, heating for about 1 to 2 hours at 180° to 200° C. in a heating furnace and then cooling the obtained foamed layer 3 by air or water.

The foamed layer 3 comprising the sponge rubber is formed by adhereing a mixture of a rubber member, e.g. a chloroprene rubber, and a foaming agent to the outer circumference of the inner cable 2 by means of a extruder, and then foaming by heating in the course of curing.

The operation and the effect of the control cable as shown in FIG. 1 will be now described.

Since the foamed layer 3 is adhered closely to the inner cable 2, and has large elasticity by increasing the volume thereof in foaming, the foamed layer 3 is not taken off during the operation of the inner cable 2, and prevents the generation of the noise.

In addition, since the foamed layer 3 is impervious to oil, a lubricant oil may be applied or filled (hereinafter referred to as "fill" for short) between the conduit 1 and the inner cable 2 provided with the foamed layer 3, whereby the foamed layer 3 reduces frictional resistance, substantially prevents from the generation of noise, and achieves the smooth operation of the control cable. Also, since the foamed layer 3 can include the lubricant oil therein, it is possible to provide the control cable which is free from the frictional resistance.

Thus, the control cable of the invention is used in the equipments or machines, e.g. an automobile, required especially to reduce the noise and to keep the silence, and achieves the smooth, comfortable operation.

Figure 2:
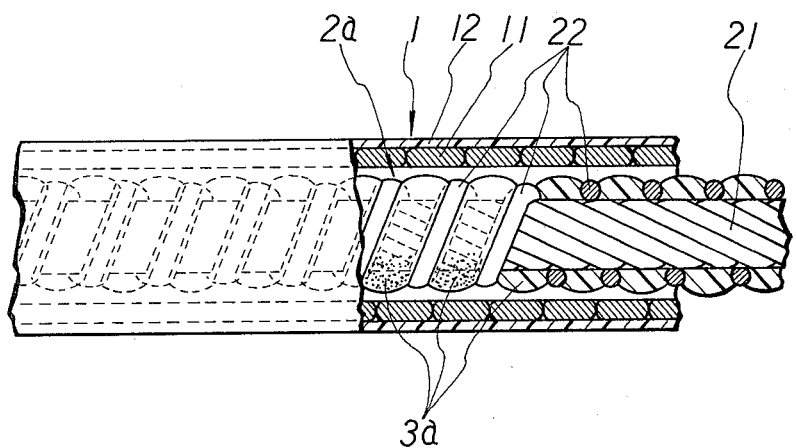
FIG. 2 is a front view partly broken away and showing another embodiment of the control cable of the present invention.

The another embodiment of the present invention as shown in FIG. 2 will be now described (the same parts as that of FIG. 1 in FIG. 2 are illustrated by the same numbers as that of FIG. 1, and are omitted the detailed description thereof). In this embodiment, a screw inner cable 2a has teeth 22 formed by winding spirally at least one wire on the outer circumference of a flexible core 21 tightly at the constant gap, and is inserted into the conduit 1.

A foamed layer 3a formed on the screw inner cable 2a is adhered to the inner cable 2a between adjacent teeth 22 so as to become a spiral belt shape, and to project more than the height of the teeth 22 outward radially. The foamed layer 3a formed in the spiral belt shape is formed by only applying the abovementioned composition for forming the foamed layer to the outer circumference of the screw inner cable 2a till the approximately same height as that of the teeth 22, and then foaming the composition, thereby obtaining the foamed layer 3a of the spiral belt shape projected outward.

The operation and the effect of this embodiment shown in FIG. 2 will be now described. When the screw inner cable 2a is operated in the metal spirit tube 11 of the conduit 1, the screw inner cable 2a is scraped with the inner face of the spiral tube 11 at only the top portion of the spiral foamed layer 3a, whereby the control cable of the invention is free from noise and has significantly reduced the frictional resistance in the same manner as the embodiment shown in FIG. 1.

Furthermore, in this embodiment shown in FIG. 2, the screw inner cable 2a is generally engaged with a gear or other screw inner cable (unillustrated, hereinafter referred to as an engaged member), thereby operating the engaged member by means of the operation of the screw inner cable 2a, or operating the screw inner cable 2a by means of the operation of the engaged member. In any cases, since the foamed layer 3a is sufficiently increased in the volume thereof by foaming, the control cable has the very significant effect which, when the screw inner cable 2a engages with the above engaged member, the foamed layer 3a is depressed by the engaged member, whereby the engagement of the screw inner cable 2a with the engaged member is ensured without preventing the engagement.

Further, the process for producing the foamed layer 3, 3a is not restricted to only the above-mentioned method.

What is claimed is:

1. A gear-operable control cable comprising:
    a conduit,
    an inner cable inserted in the conduit to be operated, the inner cable being a screw inner cable engagable with a gear comprising a core and teeth formed by winding a wire spirally on the outer surface circumference of the core at a constant gap tightly, and
    a foamed elastic layer adhered closely to the outer circumference of core between adjacent teeth along the entire core so as to project more than the height of the teeth outward radially.

2. The gear-operable control cable of claim 1, the foamed elastic layer is at least one selected from the group consisting of a foamed urethane rubber, a synthetic resin sponge and a sponge rubber.

3. The gear-operable control cable of claim 1, wherein the foamed elastic layer is produced by applying a foamable elastic composition to the outer circumference of the core between adjacent teeth formed by the spiral-wound wire to approximately the same height as that of the teeth and foaming the composition in situ.

* * * * *